UNITED STATES PATENT OFFICE.

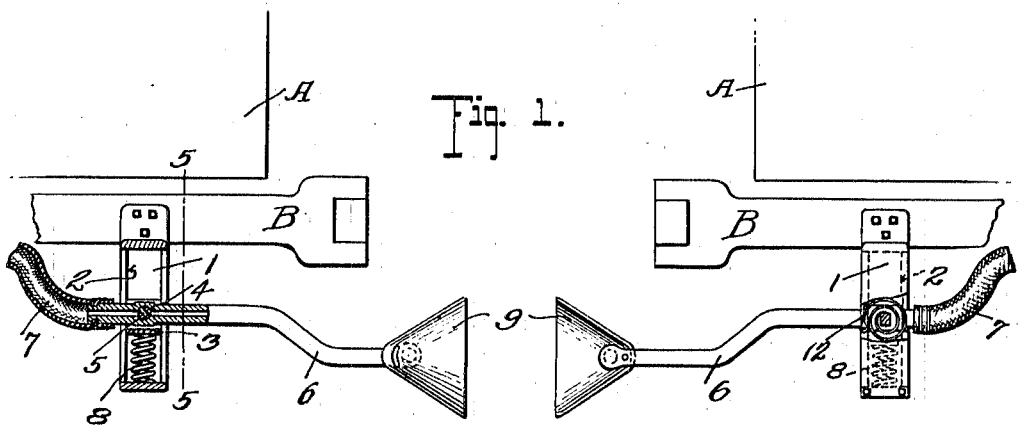

JACOB D. SCOTT, OF TOMS CREEK, VIRGINIA.

AUTOMATIC FLUID-PIPE COUPLING.

1,059,223. Specification of Letters Patent. Patented Apr. 15, 1913.

Application filed June 28, 1912. Serial No. 706,439.

*To all whom it may concern:*

Be it known that I, JACOB D. SCOTT, a citizen of the United States, residing at Toms Creek, in the county of Wise and State of Virginia, have invented certain new and useful Improvements in Automatic Fluid-Pipe Couplers, of which the following is a specification.

This invention comprises certain improvements in automatic couplings for use in connection with railway rolling stock, and is designed primarily to automatically couple the connecting fluid pipes such as air and steam pipes commonly provided in railway, freight and passenger car equipment.

Coupling means in accordance with this invention includes essentially coöperating coupling devices pivotally mounted upon the adjacent ends of the cars and operatively connected with a train pipe or pipes, said coupling means being provided with guiding heads to cause proper movement of the ends of the pipes to bring the latter together in the coupling operation. The pivotal axes of the coupling pipes comprise stationary valves yieldably mounted upon suitable brackets carried by the drawbars of the cars, the several parts being so arranged that as the cars are brought together the coupling pipes by pivotal movement will assume operative positions, such movement automatically opening the valves aforesaid for the passage of fluid medium through the now connected train pipes of the cars.

For a full understanding of the present invention, reference is to be had to the following description and to the accompanying drawing, in which:

Figure 1 is a side elevation, certain parts shown in section, showing the ends of two cars equipped with the coupling devices of the present invention, such devices being arranged in the positions maintained thereby previous to being coupled together; Fig. 2 is a side elevation, somewhat similar to Fig. 1, but showing the coupling means operatively connected; Fig. 3 is a detail view partly in section, bringing out more clearly the peculiar shape of the guiding heads carried by the free ends of the coupling devices; Fig. 4 is a sectional view taken about on the line 4—4 of Fig. 3; Fig. 5 is a vertical sectional view taken about on the line 5—5 of Fig. 1; Fig. 6 is a horizontal sectional view taken about on the line 6—6 of Fig. 5.

Throughout the following detail description and on the several figures of the drawings, similar parts are referred to by like reference characters.

Briefly describing the invention, A in the drawings diagrammatically illustrates the ends of two cars, and B the coöperating drawbars of the same.

Attached in any desirable manner to the drawbars B are the depending brackets 1 which are of somewhat U-form in elevation, as shown in Fig. 5, and which support other main parts of the coupling B. The opposite sides of each bracket 1 are formed with guide grooves 2 in which are mounted the ends of a vertically movable supporting member 3, the latter being also of somewhat U-form. A stationary valve 4, is formed with squared extremities received by seats of similar shape formed in the ends of the member 3, and said valve is provided with an inclined passage or opening 5. The valve 4 constitutes the pivotal axis of a coupling pipe 6 one end of which is attached to the train pipe 7, which latter may be an air, steam or other fluid pipe, within the purview of the invention. Beneath the supporting member 3 which slides in the bracket 1 as above described, is a coiled spring 8, one end of which has a bearing against the lower end of the bracket 1, and in the other or upper end of which has a bearing against the under side of said member 3. The spring 8 normally coöperates with the supporting member to hold the latter, together with the valve and coupling pipe 6, in the normal position shown in Fig. 1, when the coupling pipe is not in coupled position.

On the free or outer end of the pipe 6, is rigidly mounted a flaring guiding head 9 which flares not only upwardly and downwardly but outwardly, being of a shape somewhat similar to a bell cut in half longitudinally. The coupling pipe 6 has a lateral fluid opening adjacent to the inner terminal of the guiding head 9, said opening being surrounded by a gasket 10. On the outer side of said pipe 6, or the side opposite the gasket 10 is a projection 11 designed to interlock with the guiding head carried by the coupling pipe supported by another car.

It will be observed that the coupling pipe 6 inclines downwardly toward its free end, and the operation of the invention under practical conditions of service is as follows: Assuming that the two cars A are about to be coupled, as they approach one another, and before the drawbars B are coupled, the guiding heads 9 of the coöperating pipes 6 guide the free ends of said pipes to bring them into meeting relation with the extremities side by side, and the gaskets 10 abutting to establish an air-tight connection. The action of the guiding heads 9 in meeting is to impart downward pivotal movement to the coupling pipes 6, such movement being permitted by reason of the pivotal mounting of the pipes 6 upon the valves 4 as above described. When the pipes 6 reach a predetermined point in their downward movement, as limited by the coupling of the drawbars B, said pipes 6 will have reached a position substantially as shown in Fig. 2, wherein the passages through the pipes are in register with the inclined valve openings 5, communication being thus established between the train pipes 7 of the respective cars. In the above operation, not only is the coupling of the pipes 6 automatic, but furthermore, the relative movement of the pipes and valves affords an automatic opening of the valves in a manner which will be readily apparent. The purpose in mounting the coupling pipes resiliently upon the brackets 1 is to eliminate the necessity of a very finely estimated adjustment in positioning the coupling means upon the drawbars, which would otherwise be required. The resilient mounting above referred to is obtained primarily by the employment of the spring 8, there being a second spring 12 of the coiled type arranged to encircle the valve 4 exterior to the portion of the valve received by its coupling pipe 6. The spring 12 is connected at one end to the pipe 6, and at its other end to the adjacent extremity of the supporting member 3, and said spring 12 is under tension to normally raise the coupling pipe to a substantially horizontal position after it is uncoupled from another coöperating pipe. By reason of the provision of the spring 12 the uncoupling operation automatically restores the coupling pipe 6 to the position shown in Fig. 1 and thereby automatically closes the valve 4.

It will be understood that if desired the coupling pipe 6 may be provided with one or more passages connected with one or more fluid pipes in the car, such an expedient representing merely a duplication of the construction set forth, and being possibly desirable under some conditions of service where cars are equipped with more than one train pipe.

The projection 11 on the free end of the coupling pipe is adapted to be received in an arc-shaped slot of the other guiding head, and to move freely in said arc-shaped slot as the coupling pipes move pivotally in their coupling operation.

Having thus described the invention, what is claimed as new is:

1. In coupling means of the class described, the combination, with a resilient support, a coupling pipe sustained thereby, a pivotal connection between the support and pipe, a spring connected to sustain the coupling pipe in a given relative position with respect to said pivot, and a valve for the coupling pipe comprising the pivot.

2. In coupling means of the class described, the combination, with a draw bar, of a spring sustained thereby, a coupling pipe, supporting means for the coupling pipe mounted on said spring, a pivotal connection between the coupling pipe and the supporting means, that portion of said pivotal connection within the coupling pipe comprising a valve, and a spring connected to the valve and to the coupling pipe for resiliently sustaining the coupling pipe against pivotal movement.

3. In coupling means of the class described, the combination with a drawbar, of a bracket carried by said drawbar, a coupling pipe, a supporting member slidably mounted on the bracket, a valve constituting a pivot for the coupling pipe and carried by the supporting member, said valve having a valve opening adapted to register with the passage through the coupling pipe when the latter reaches a predetermined point in its pivotal movement, spring means yieldably holding the said supporting member in a predetermined position on the bracket, and other means for holding the coupling pipe in a predetermined position in relation to the valve.

4. In coupling means of the class described, the combination with a drawbar, of a bracket carried by the latter, a supporting member movably mounted on the bracket, a coupling pipe having guiding means at its free end, a pivot connecting the coupling pipe and supporting member, means coöperating with the supporting member to resiliently hold the latter in a predetermined position, and means coöperating with the coupling pipe and resiliently holding the said pipe in a predetermined position in relation to the pivot.

In testimony whereof I affix my signature in presence of two witnesses.

JACOB D. SCOTT.

Witnesses:
W. T. PAPE,
L. N. ODLE.